Aug. 15, 1933.                  G. E. A. HALLETT                    1,922,678
                                 SLIDE VALVE ENGINE
                              Filed Oct. 22, 1928              2 Sheets-Sheet 2

Inventor
George E. A. Hallett
By Blackmore, Spencer, & Flint
Attorneys

Patented Aug. 15, 1933

1,922,678

UNITED STATES PATENT OFFICE 1,922,678

SLIDE VALVE ENGINE

George E. A. Hallett, Detroit, Mich., assignor to General Motors Research Corporation, Detroit, Mich., a Corporation of Delaware Application October 22, 1928. Serial No. 314,240

9 Claims. (Cl. 123—188)

This invention relates to internal combustion engines and particularly to internal combustion engines which are provided with sliding and/or rotating valves.

Internal combustion engines which are provided with sliding and/or rotating valves have certain well known advantages over those which are provided with poppet valves. However, for several reasons, among which may be mentioned the difficulty of preventing the escape of gases from the cylinders of engines of the sliding and/or rotating valve type and the consequent loss of compression and decrease in power, engines of these types have not heretofore been in general use notwithstanding their several advantages over poppet valve engines.

It is an object of this invention to provide an internal combustion engine of the sliding and/or rotating valve type which is so constructed and arranged that the escape of gases from the cylinders thereof is prevented at all times except during the exhaust periods.

The above mentioned object is attained, in certain embodiments of my invention, by the utilization of an improved slide valve and an improved type of seal which cooperates with the valve to prevent the escape of gas under pressure from the cylinder, although it is to be understood that either the valve or the seal may be used alone.

It is another object of my invention to provide certain new and useful improvements in means for lubricating and for retaining lubricant on the valves of an internal combustion engine of the slide valve type.

Other objects of the invention will be obvious from a perusal of the following specification in which are described the embodiments of my invention which are shown in the accompanying drawings.

In the drawings:

Figure 4 is an enlarged fragmentary section through one of the ports and sealing pistons of the engine shown in the preceding figures.

Figure 5 is a view similar to Figure 4, but showing a modified form of sealing piston.

Figure 6 is a valve-end elevation of the sealing piston shown in Figure 5.

Figure 7 is a view similar to Figures 4 and 5, but showing another modified form of sealing piston.

Figure 1:
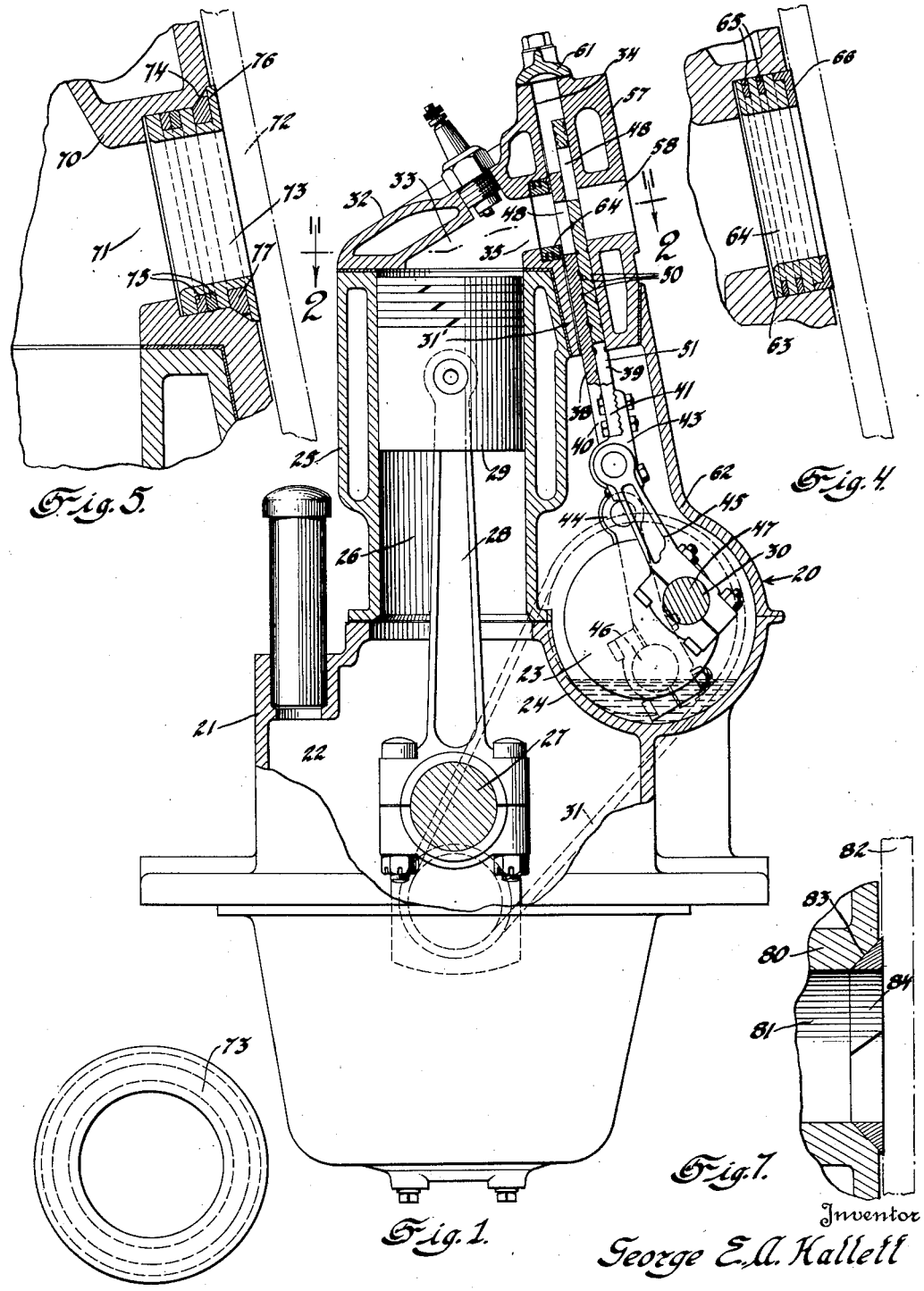
Figure 1 is a view, partly in end elevation of, and partly in transverse cross section through, an internal combustion engine of the slide valve type in which is embodied my invention.
Figure 2:
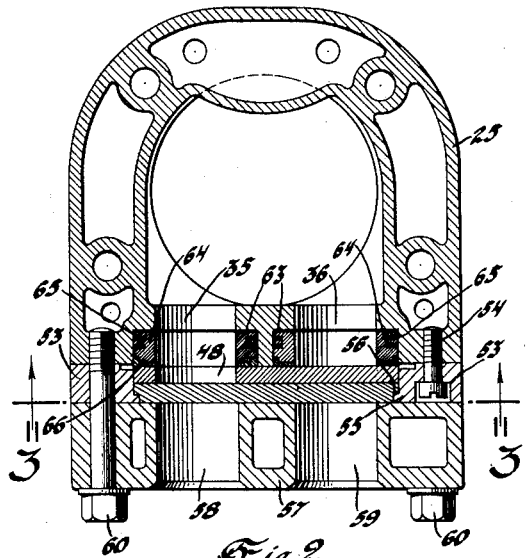
Figure 2 is a section taken on the line 2—2 of Figure 1 or Figure 3.

In the drawings, referring particularly to Figures 1—4, the reference character 20 indicates an internal combustioin engine of the four stroke cycle type which includes a crankcase 21 having therein a main crank compartment 22 and an eccentric shaft compartment 23 separated from the compartment 22 by a wall 24. Seated on and suitably secured to the crankcase 21 is the cylinder block 25 having therein a cylinder 26 which opens at its lower end into the main crank compartment 22.

The crankshaft 27 is located in the main crank compartment 22 and is journalled, as usual, in suitable bearings in the crankcase. Connected at its lower end to the crankshaft, in the usual manner, is a connecting rod 28 which extends upwardly into the cylinder 26 and there is connected to the piston 29 in the usual manner. In the eccentric shaft compartment 23, there is located the eccentric shaft 30 which is journalled in suitable bearings and is arranged to be positively driven from the crankshaft by suitable means, such as the chain 31.

The upper end of the cylinder is closed by a head 32 in which there is provided a combustion chamber 33 which opens into the upper end of the cylinder 26. On one lateral side of the head 32, there is provided an inclined wall 34 through which extend, from the combustion chamber 33 to the outside of the engine, inlet and exhaust ports 35 and 36, which are located in the same horizontal plane. On the inclined wall 34 of the head and on a lip 31' formed integral with the head and which forms an extension of the inclined wall 34, there is seated the inner slide valve 38, and on the outer face of the inner slide valve, there is seated the outer slide valve 39. To ears 40 and 41 formed on the lower ends of the inner and outer slide valves, there are connected brackets 42 and 43, respectively, to which are pivoted the upper ends of connecting rods 44 and 45, respectively. The lower ends of the connecting rods 44 and 45 are suitably connected to angularly related crank pins 46 and 47 which are provided on the eccentric shaft 30.

Each of the valves 38 and 39 consists of a flat plate of suitable material having therein an inlet port 48 adapted to be brought into registration with the inlet port in the cylinder head and with the inlet port in the other valve at the proper moment to allow a charge of combustible mixture to enter the cylinder, and an exhaust port 49 spaced laterally and longitudinally of the valve from the inlet port and adapted to be brought into registration with the exhaust port in the cylinder head and the exhaust port in the other valve at the proper moment to allow discharge of exhaust gases from the cylinder. On the outer face of the inner valve and on both faces of the outer valve, there are provided transverse lubricant retaining grooves 50. In order to provide for flexing of the bodies of the valves with respect to their attaching ears and for flexing of the two port containing sides of the body with respect to each other to insure proper seating of the valves, and, incidentally, to reduce the weight of the valves, there are provided in each of the valves an opening 51 extending across the line between the body portion thereof and the attaching ear, and a slot 52 extending longitudinally from adjacent one end of the body of the valve to adjacent the other end and intermediate the ports therein.

To prevent lateral movement of the valves, there are provided guide members 53 contacting with the lateral edges of the valves and secured to the cylinder head and block by screws 54. Preferably, the guide members are provided with portions 55 overhanging the valves and seated in rabbets 56 formed in the outer face of the outer valve to maintain the inner valve seated against the walls 34 and 31' and the outer valve seated against the inner valve although, obviously, the overhanging portions and the rabbets may be dispensed with since the cover plate 57, which is provided with ports 58 and 59 in registration with the ports 35 and 36 in the cylinder head, which forms a seat for the outer face of the outer valve and which is secured to the cylinder head and block by the screws 60, will perform this function.

As shown in the drawings the upper end of the valve case is closed by a removable cap or cover 61. The outer side of the eccentric shaft compartment 23 is closed by a cover plate 62 which may be removed, when desired to gain access to the connecting rods and the eccentric shaft.

To prevent loss of pressure from the cylinder, I counterbore each of the ports 35 and 36 from the outer side of the inclined wall 34, as indicated at 63. In each of these counterbores 63 is located a cast iron sealing piston 64 having therethrough an opening coaxial with the port opening and of substantially the same diameter. In the outer wall of the piston 64 there are provided a plurality of ring grooves in each of which is located a sealing ring 65 to prevent the passage of gases between the walls of the counterbore and the walls of the piston. The outer end of the piston 64, which bears against the inner slide valve 38, is provided with a facing 66 of high lead bronze or other non-ferrous alloy to insure a good bearing surface between the slide valve and the piston.

When the engine is running, the explosions of the combustible mixture cause the piston to reciprocate in the cylinder which causes rotation of the crankshaft and of the eccentric shaft by reason of the driving connection between the two shafts. Rotation of the eccentric shaft causes the slide valves 38 and 39 to reciprocate in the valve case and the ports therein to register with each other and with the ports in the cylinder head and those in the cover plate 57 at the proper intervals to allow intake and exhaust, as previously described. By reason of the construction of the slides and the provision of the sealing piston, hereinbefore described, the loss of gas from the cylinder is prevented during the periods when it is under superatmospheric pressure and the exhaust ports are not in registration, as described above. During these periods, some of the gas under pressure flows into the spaces 67 between the inner ends of the pistons 64 and the end walls of the counterbores and exerts an outward thrust on the pistons which maintains them in gas tight contact with the inner surface of the inner slide valve from which the oil retaining grooves have, as mentioned before, been omitted and prevents the escape of gases therebetween. The application of pressure independently to the two port containing sides of the valves will cause relative flexing thereof when this is necessary to insure gas-tight surface contact therebetween or between the outer face of the outer valve and the inner wall of the cover plate.

In slide valve engines in which the eccentric shaft is located in the crankcase and the splash from the crankshaft is depended upon to lubricate the slide valves, it is generally the case that too little or too much lubricant is supplied to the valves. In my engine, this difficulty is obviated by locating the eccentric shaft and the crank shaft in non-communicating compartments and regulating the supply of lubricant in the eccentric shaft compartment so that during the operation of the engine the eccentrics will splash the desired amount of lubricant on the lower ends of the valves. The inherent pumping action of the sliding valves will carry lubricant to the upper ends of the valves and distribute it over the bearing surfaces thereof. The grooves 50 serve to catch and retain a supply of lubricant for distribution to the bearing surfaces of the valves when needed.

In the construction shown in Figures 5 and 6, the reference character 70 indicates the cylinder head, the reference character 71 a port opening through the cylinder head, and the reference character 72 the inner slide valve of an engine similar to that shown in the preceding figures. The port opening 71 is, as in the preceding figures, counterbored to receive a sealing piston 73 which has therethrough an opening coaxial with and of substantially the same diameter as that of the port opening. In addition, the outer end of the wall of the counterbore is bevelled, as indicated at 74. The sealing piston includes an annular body portion whose inner end is normally spaced slightly from the inner end of the counterbore and which is provided with a circumferential groove in its outer wall in which are located a pair of sealing rings 75. On the outer end of the sealing piston, there is provided an integral annular flange 76 overhanging the walls of the counterbore and adapted to be seated on the bevelled wall 74. Inwardly of this flange and seated in an annular groove in the body of the piston 73, there is a split spring ring 77 having a bevelled edge seated on the bevelled wall 74. It will be observed that the tendency of the ring 77 to expand will urge the piston 73 outwardly and against the inner side valve 72 and maintain it there independently of the pressure condition within the cylinder. Except as noted above, the action of the sealing piston 73 is similar to that of the sealing piston shown in the preceding figures.

In Figure 7, the reference characters 80, 81 and 82 indicate, respectively, the cylinder head, a port opening through the cylinder head and the inner slide valve of an engine similar to that shown in Figures 1—4. In Figure 7, the outer walls of the port are bevelled, as indicated at 83, and there is provided a split spring ring 84 having a bevelled edge seated on the bevelled wall 83. It will be obvious that both the inherent tendency of the ring to expand and, when the gases in the cylinder are under pressure, the radial pressure exerted thereby against its inner wall will urge the ring outwardly against the slide valve 82 and effectively prevent the escape of gases from the cylinder.

Figures 8, 9:
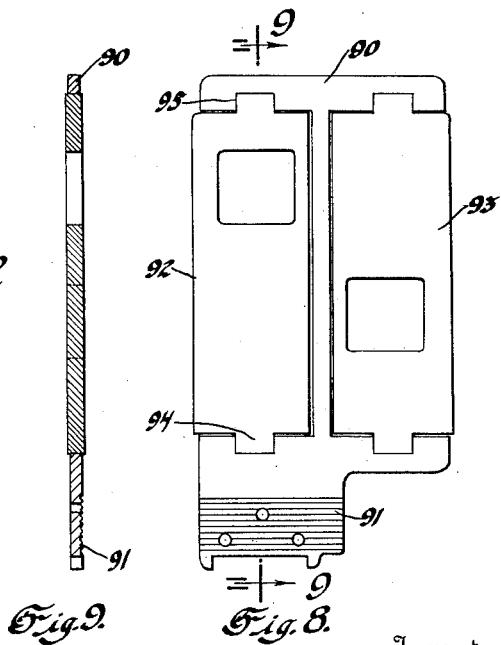
Figure 8 is a side elevation of a modified form of slide valve.
Figure 9 is a section on the line 9—9 of Figure 8.

In Figures 8 and 9, there is shown a modified form of slide valve which includes a substantially I-shaped frame 90 whose vertical leg is adapted to be positioned between the inlet and exhaust ports of an engine similar to that shown in the preceding figures and which has formed on its lower cross-arm an attaching ear 91. On opposite sides of the vertical leg of the frame, there are provided port containing valve plates 92 and 93 whose thickness is somewhat greater than that of the frame. On the opposite ends of each of the valve plates, there are provided projections 94 which extend into notches 95 in the upper and lower cross-arms of the frame and connect the valve plates to the frame so as to allow them to independently adjust themselves to surface contact with their seats, but to prevent movement thereof longitudinally or laterally with respect to the frame. When valves of the type shown in Figures 8 and 9 are used in an engine having port sealing pistons of any of the types previously described, the outward pressure of the inlet port and the exhaust port sealing pistons will independently seat the corresponding pairs of valve plates on their seats in gas tight relation. Either of the valve plates obviously may be easily replaced when worn or warped.

Figure 10:
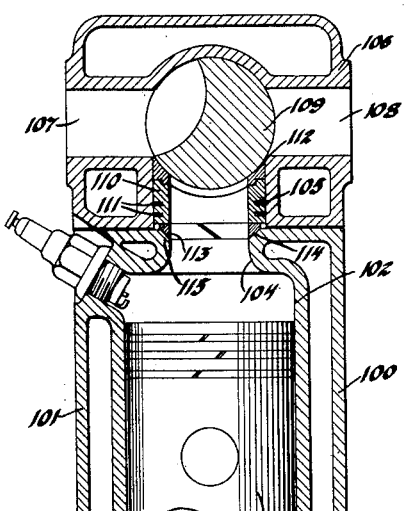
Figure 10 is a fragmentary cross section through a rotary valve engine in which is embodied my invention.
Figure 3:
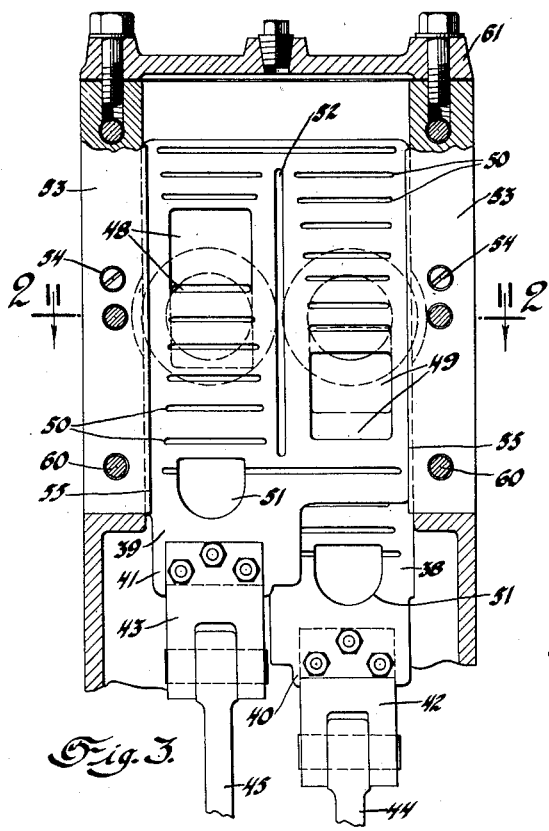
Figure 3 is a fragmentary section taken on the line 3—3 of Figure 2.

In Figure 10, there is shown an internal combustion engine 100 which includes a cylinder block 101 having therein a cylinder 102 in which is provided, as usual, a piston 103. An opening 104 of smaller diameter than the cylinder opens thereinto from the top of the block. Secured on top of the block and having therein an opening 105 coaxial with the opening 104 and of somewhat larger diameter is the cylinder head 106. From opposite sides of the head, there extend thereinto the exhaust and intake port openings 107 and 108, respectively. Extending longitudinally of the head at the juncture of the ports 107 and 108 and the opening 105 is a cylindrical rotary valve 109 which is driven from the crankshaft and is adapted to successively open and close the cylinder 102 to the exhaust and intake ports 107 and 108.

To prevent loss of pressure from the cylinder, I provide in the opening 104 an annular sealing piston 110 having in its outer wall circumferential grooves in each of which is located a sealing ring 111. Seated on the upper edge of the piston 110 and bearing against the cylindrical walls of the valve is a facing ring 112 of high lead bronze or other non-ferrous alloy. A spilt spring ring 113 has a bevelled edge 114 seated on the bevelled upper edge 115 of the wall surrounding the opening 104 and bears at its upper side against the lower end of the sealing piston. It will be observed that the tendency of the spring ring 113 to expand will urge the facing ring 112 into leak-proof contact with the cylindrical walls of the valve 109, and that, when the gas in the cylinder is under pressure, the radial pressure exerted thereby on the ring 113 will more strongly urge the facing ring 112 against the cylindrical walls of the valve, and, since any gas which may leak past the spring ring cannot pass the rings 111, a very effective seal is provided.

It will be obvious that, although I have shown and described preferred embodiments of my invention, this has not been done with the intention of limiting my invention thereto but merely by way of example, and that the scope of my invention is limited only by the appended claims.

I claim:

1. In an internal combustion engine, a combustion chamber, a pair of ports opening through the wall of the combustion chamber, and a flat slide valve provided with relatively movable portions each having therein a port adapted to register with the one of the ports in the wall of the combustion chamber.

2. In an internal combustion engine including a cylinder block and a cylinder head seated on the upper end of the block and provided with a surface forming a seat for a sliding valve, an extension on and formed as a part of said head extending below the upper end of the cylinder block and forming a continuation of said seat.

3. In an engine, a pair of ports, and a valve provided with relatively movable portions of which each is adapted to register with one of the ports.

4. In an engine, a wall through which extends a port which is countersunk from one side, an annular seal fitting in the countersink, a sealing ring located in a groove in the outer wall of the sealing element and bearing against the wall of the countersink, and a spring ring seated in a groove in the outer wall of the sealing element adapted to urge the sealing element outwardly in the countersink.

5. In an engine, a valve which includes a port sealing portion, a portion through which the valve is adapted to be connected to an operating mechanism, and a flexible portion connecting the first mentioned portions.

6. In an engine, a valve which includes portions of which each is adapted to seal a port, and a slot extending longitudinally between the port sealing portions and so arranged as to render the portion connecting the port sealing portions flexible.

7. In an engine, a valve which includes a pair of port sealing portions, a portion through which the valve is adapted to be connected to an operating mechanism, a flexible portion connecting the port sealing portions to the portion which is adapted to be connected to the operating mechanism, and a flexible portion connecting the two port sealing portions.

8. In an engine, a valve which includes a frame and a pair of port controlling portions movable with respect to the frame.

9. In an engine, a valve which includes a generally I-shaped frame, and a port controlling portion disposed on each side of the vertical leg of the frame and so connected to the frame as to be capable of moving only in a direction at a right angle to the plane of the frame.

GEORGE E. A. HALLETT.